Fig. 1A

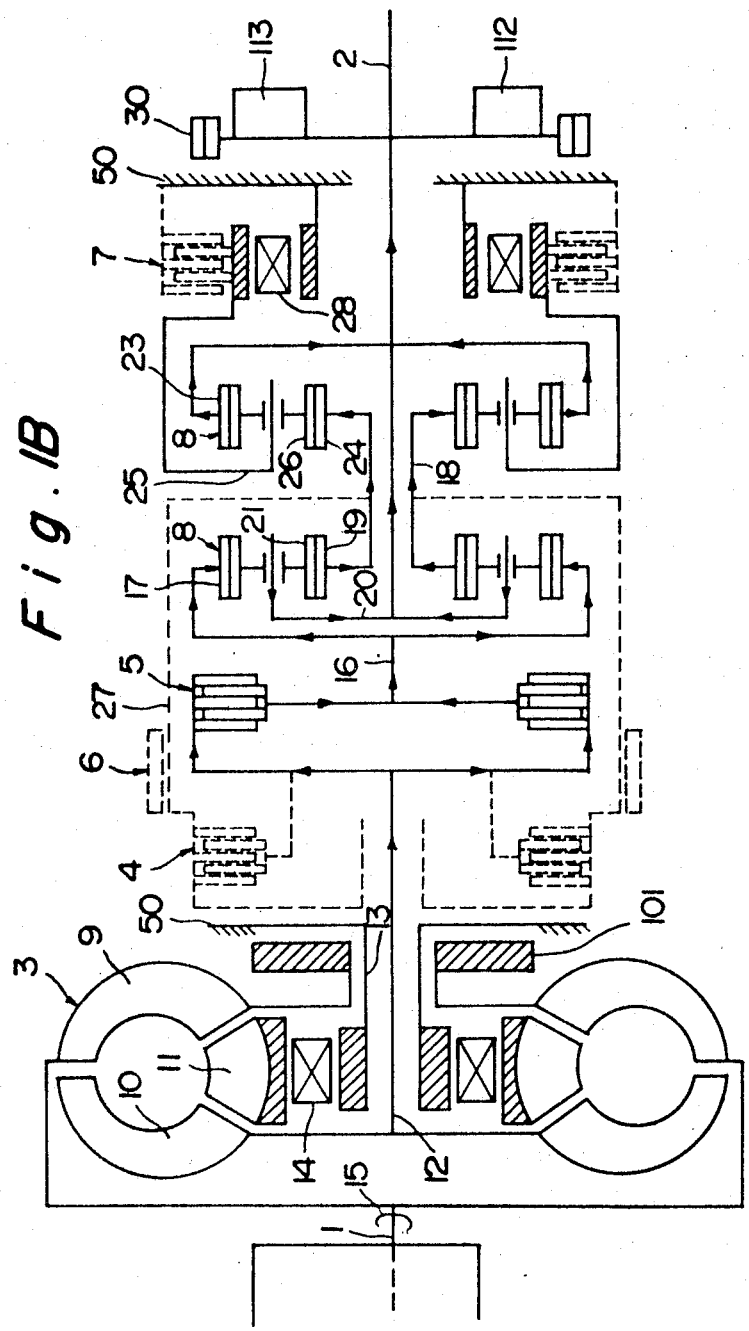

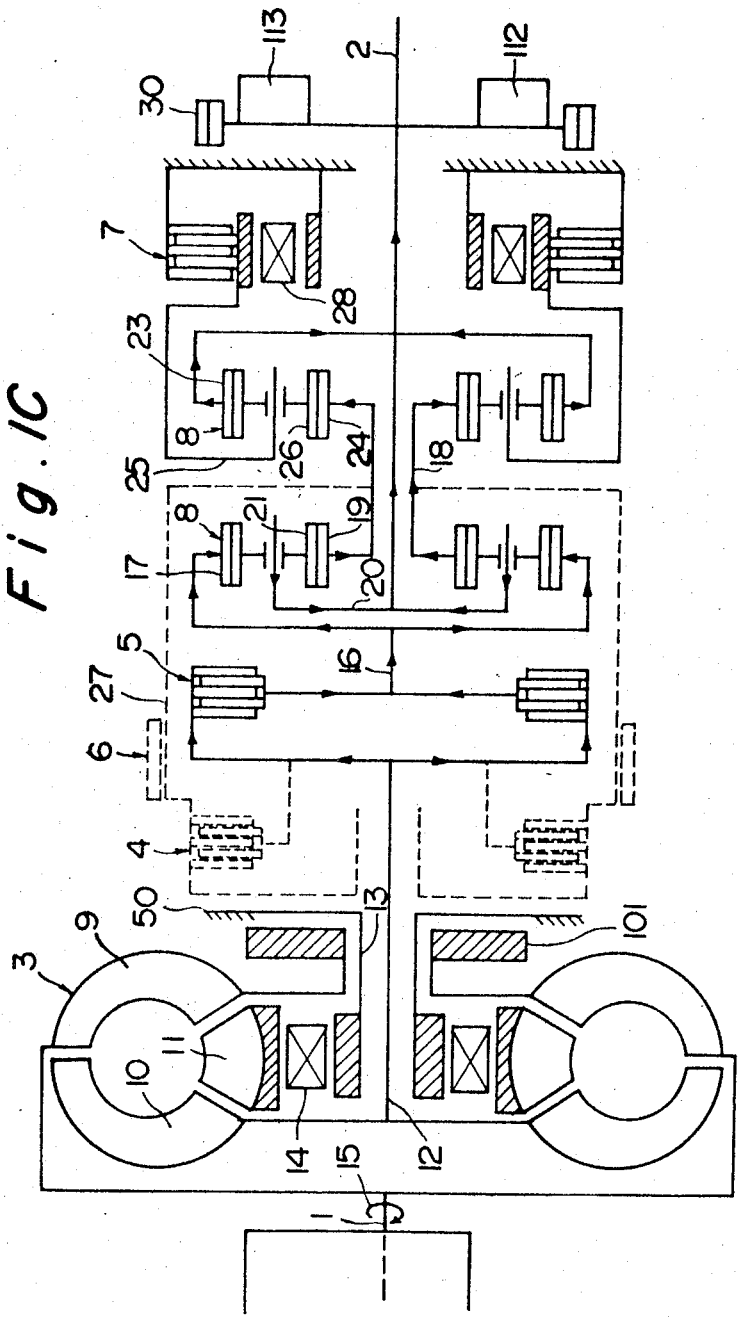

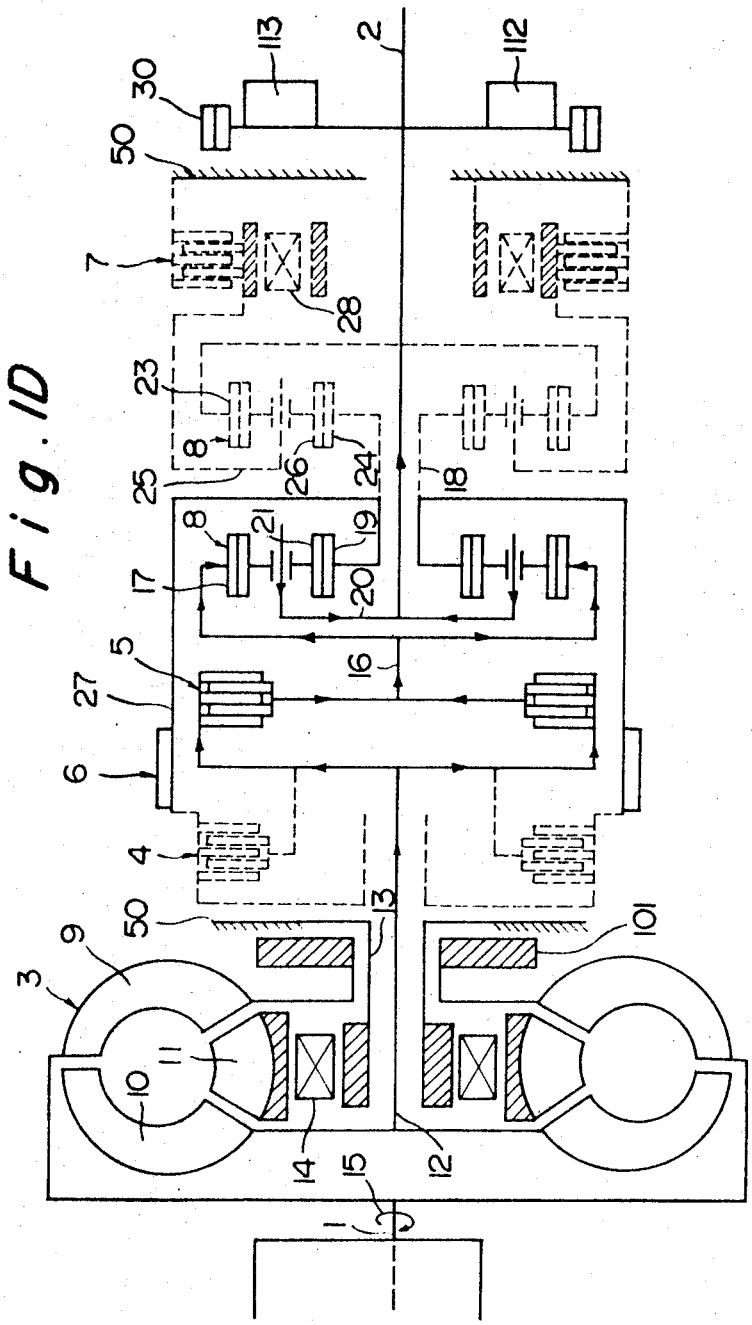

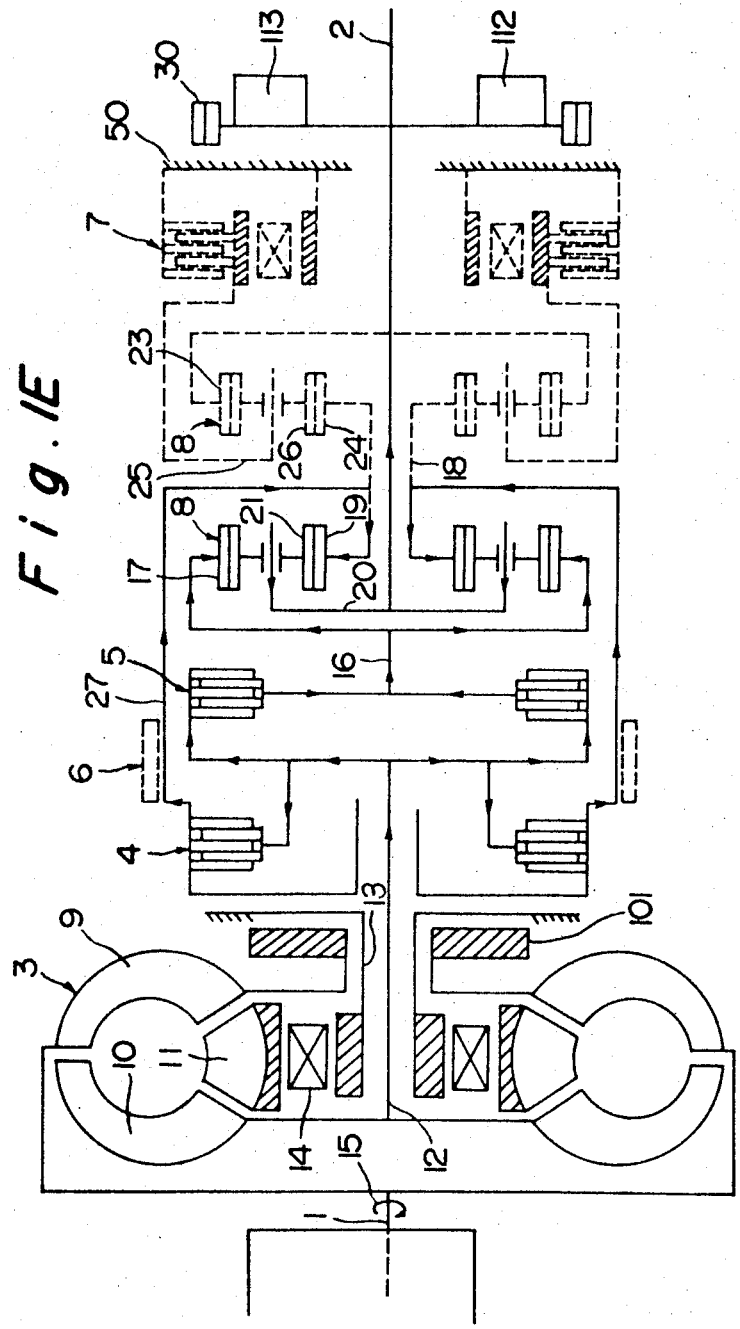

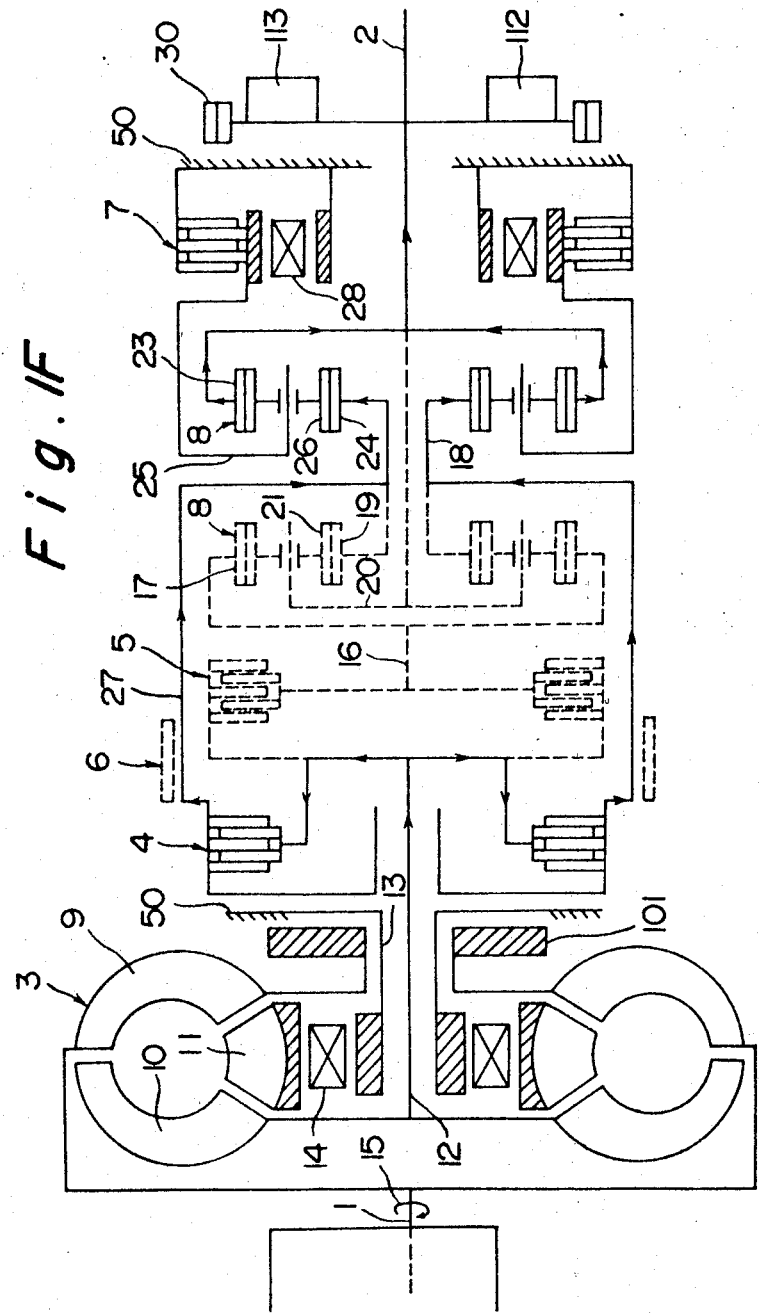

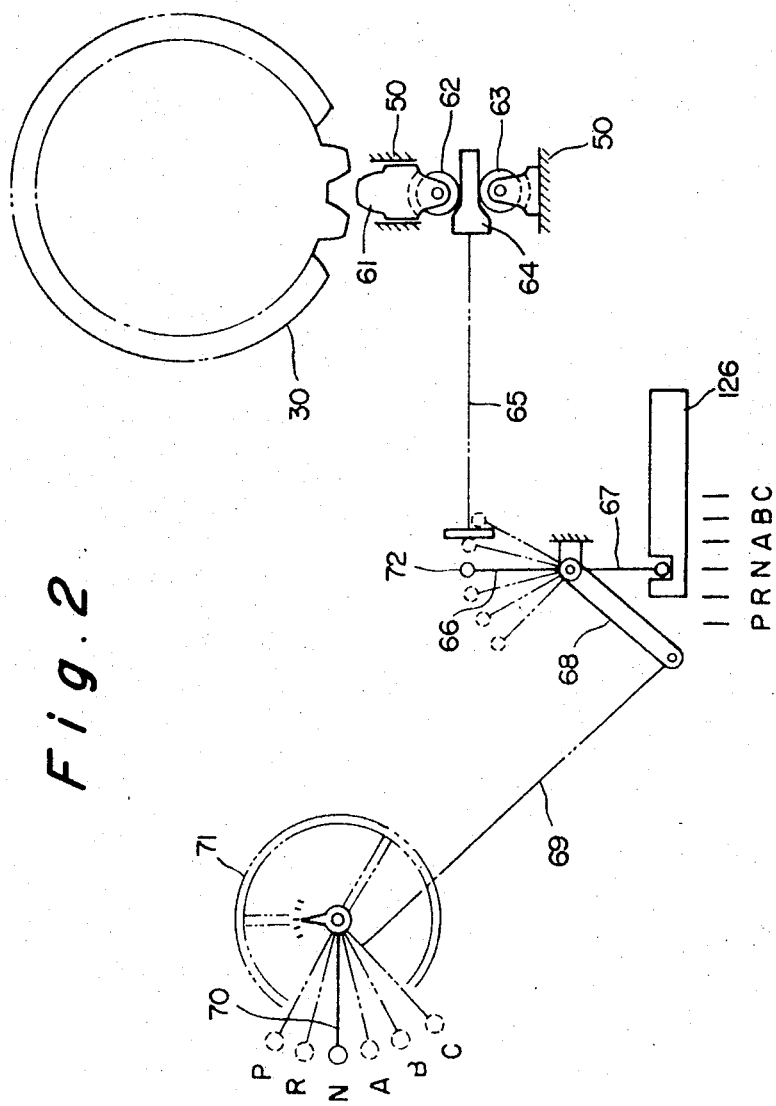

Fig. 7

| Selecting Valve Position | Passageway | | | | | | | |
|---|---|---|---|---|---|---|---|---|
| | 201 205 | 202 | 203 | 204 | 206 | 207 | 147 | 155 |
| P | | | O | O | | | | |
| R | | | O | O | | | | O |
| N | | | | | | | | |
| A | O | O | | | | | O | |
| B | | O | O | | O | | O | |
| C | | | O | O | | O | O | |

Fig. 8

| Selecting Valve Position | Passageway | | | | | | |
|---|---|---|---|---|---|---|---|
| | 150 | | 153 | | | 147 | 155 |
| P | | | O | | | | |
| R | | | O | | | | O |
| N | | | | | | | |
| A (D) | O | | | | | O | |
| B (L) | | | O | | | O | |

Fig.9

| Selecting Valve Position | Passageway | | | | | | |
|---|---|---|---|---|---|---|---|
| | | 150 | | 153 | 209 | 147 | 155 |
| P | | | | O | | | |
| R | | | | O | | | O |
| N | | | | | | | |
| A (D) | | O | | | | O | |
| B (D₂) | | O | | | O | O | |
| C (L) | | | | O | | O | |

Fig.10

| Selecting Valve Position | Passageway | | | | | | |
|---|---|---|---|---|---|---|---|
| | 209 | 150 | | 153 | | 147 | 155 |
| P | | | | O | | | |
| R | | | | O | | | O |
| N | | | | | | | |
| A (D₂) | O | O | | | | O | |
| B (D) | | O | | | | O | |
| C (L) | | | | O | | O | |

Fig. 11

| Selecting Valve Position | Passageway | | | | | | | |
|---|---|---|---|---|---|---|---|---|
| | 150 | | | 153 | | 210 | 147 | 155 |
| P | | | | O | | | | |
| R | | | | O | | | | O |
| N | | | | | | | | |
| A (D) | O | | | | | | O | |
| B (L₂) | | | | | | | O | |
| C (L₁) | | | | O | | O | O | |

Fig. 12

| Selecting Valve Position | Passageway | | | | | | | |
|---|---|---|---|---|---|---|---|---|
| | 150 | | | 153 | 209 | 210 | 147 | 155 |
| P | | | | O | | | | |
| R | | | | O | | | | O |
| N | | | | | | | | |
| A (D) | O | | | | | | O | |
| B (2) | | | | | | O | O | |
| C (L₁) | | | | | O | | O | |

United States Patent Office 3,463,180
Patented Aug. 26, 1969

3,463,180
AUTOMATIC SHIFTING DEVICE OF AUTOMATIC SPEED CHANGE GEAR FOR AUTOMOBILES
Katsuo Yamada, Yokohama, Japan, assignor to Nissan Jidosha Kabushiki Kaisha
Filed Nov. 9, 1967, Ser. No. 681,746
Claims priority, application Japan, Nov. 15, 1966, 41/74,820
Int. Cl. F16k 11/00
U.S. Cl. 137—269   3 Claims

ABSTRACT OF THE DISCLOSURE

An automatic shifting device of an automatic speed change gear for automobiles, including a manually selecting valve having a partitioning board with through holes and a change-over valve having a detachable steel ball, wherein a number of different combinations of operative conditions of said automatic speed change gear can be achieved simply by modifying the pattern of the through holes of the partitioning board and keeping or removing the detachable ball of the change-over valve.

---

This invention relates to shifting device of an automatic speed change gear for automobiles.

An automatic speed change gear to be operated at different stages of speed reduction ratio comprises a hydraulic torque converter, a driving shaft, a driven shaft, planetary gear assemblies, one or more one-way clutches, one or more hydraulically operated frictional clutches and brakes, a shift control device, fluid pump to provide fluid pressure, a mechanism for transferring information representing engine loading conditions to said shift control device, a governor valve mechanism to detect automobile speed and transfer information representing the automobile speed to said shift control device, and a manually selecting mechanism to transfer information representing the selected position of a manually selecting lever, located, for instance, on a dashboard at the driver's seat.

A manually selecting lever, usable in conjunction with the automatic shifting device according to the present invention, can selectively assume several operative positions; namely a position "P" for parking, a position "R" for rearward operation, a position "N" for keeping the speed change gear under neutral conditions, and two or three forward positions. In the case of two forward positions, such two positions include a position "D" for normal driving and another position "L" for readying engine brake, for instance during downward driving along a slope. In the case of three forward positions, there are a number of different possible combinations of such positions.

An object of the present invention is to provide an automatic shifting device of automatic speed change gear of simple construction, which can be adapted to any of the various combinations of the forward operative positions of the speed change gear.

As described above, the present invention is to provide an automatic shifting device for speed change gear having two or more selectable forward operative stages, which can be adapted to different combinations of the forward operative positions by simple change of the parts thereof. Accordingly, although the present invention will be described hereinafter referring to an automatic speed change gear having three forward stages of speed reduction ratio, the automatic shifting device according to the present invention can be applied to any multistage speed change gears, such as two stage speed change gear or a four stage speed change gear.

For a better understanding of the invention, reference will be made to the accompanying drawings, in which:

FIGS. 1-A to 1-F are skeleton diagrams of a speed change gear to which the automatic shifting device according to the present invention can be applied, shown at different operative stages, respectively;

FIG. 2 is a diagrammatic illustration of a mechanism to be used in the parking stage;

FIG. 7 is a schedule of oil passageways to be actuated in each operative position of the speed selecting valve; and FIGS. 8 to 12 are schedules similar to FIG. 7, showing oil passageways actuatable in different embodiments of the present invention.

Like parts are designated by like symbols and numerals throughout the drawings.

Figure 1A:
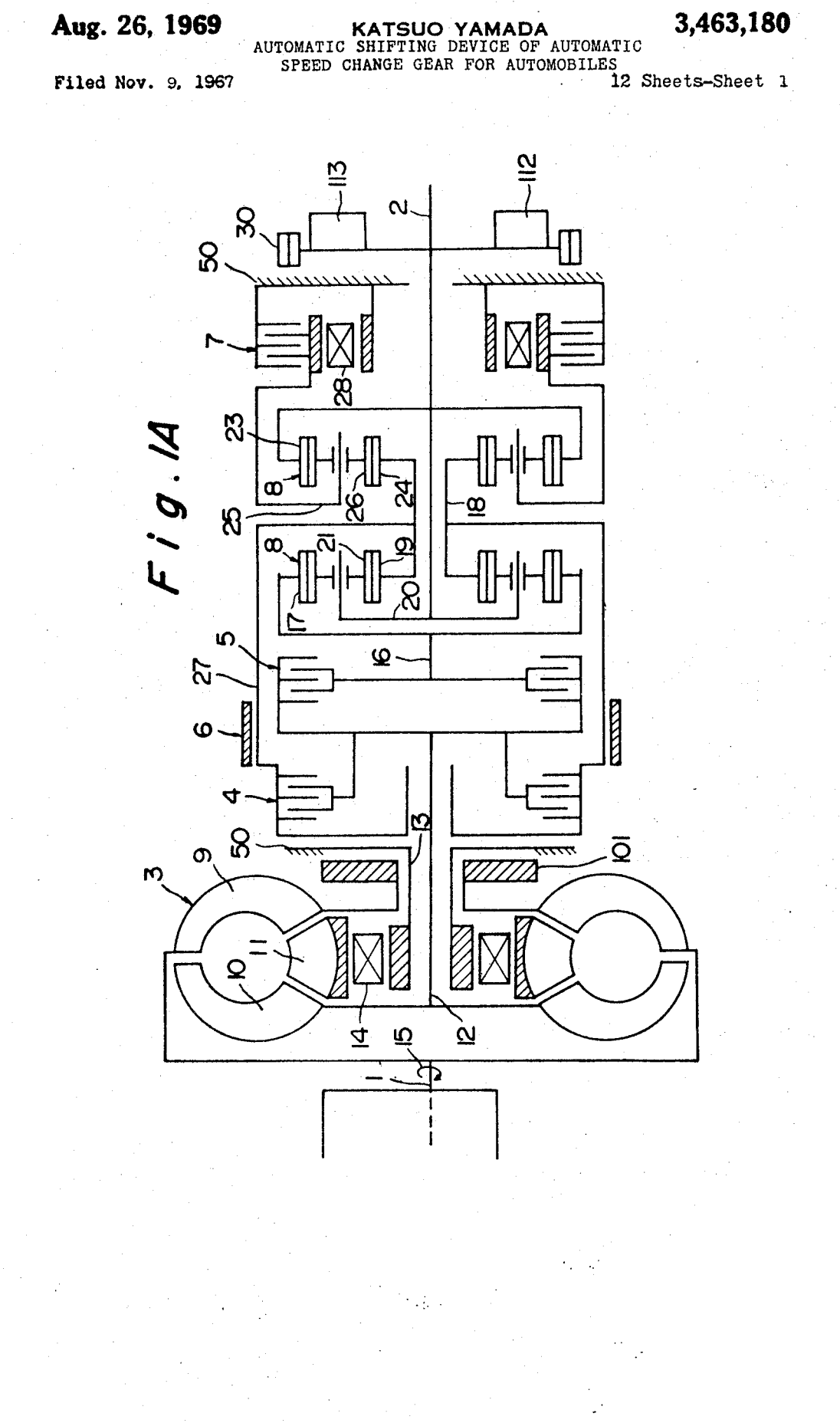
Figure 3:
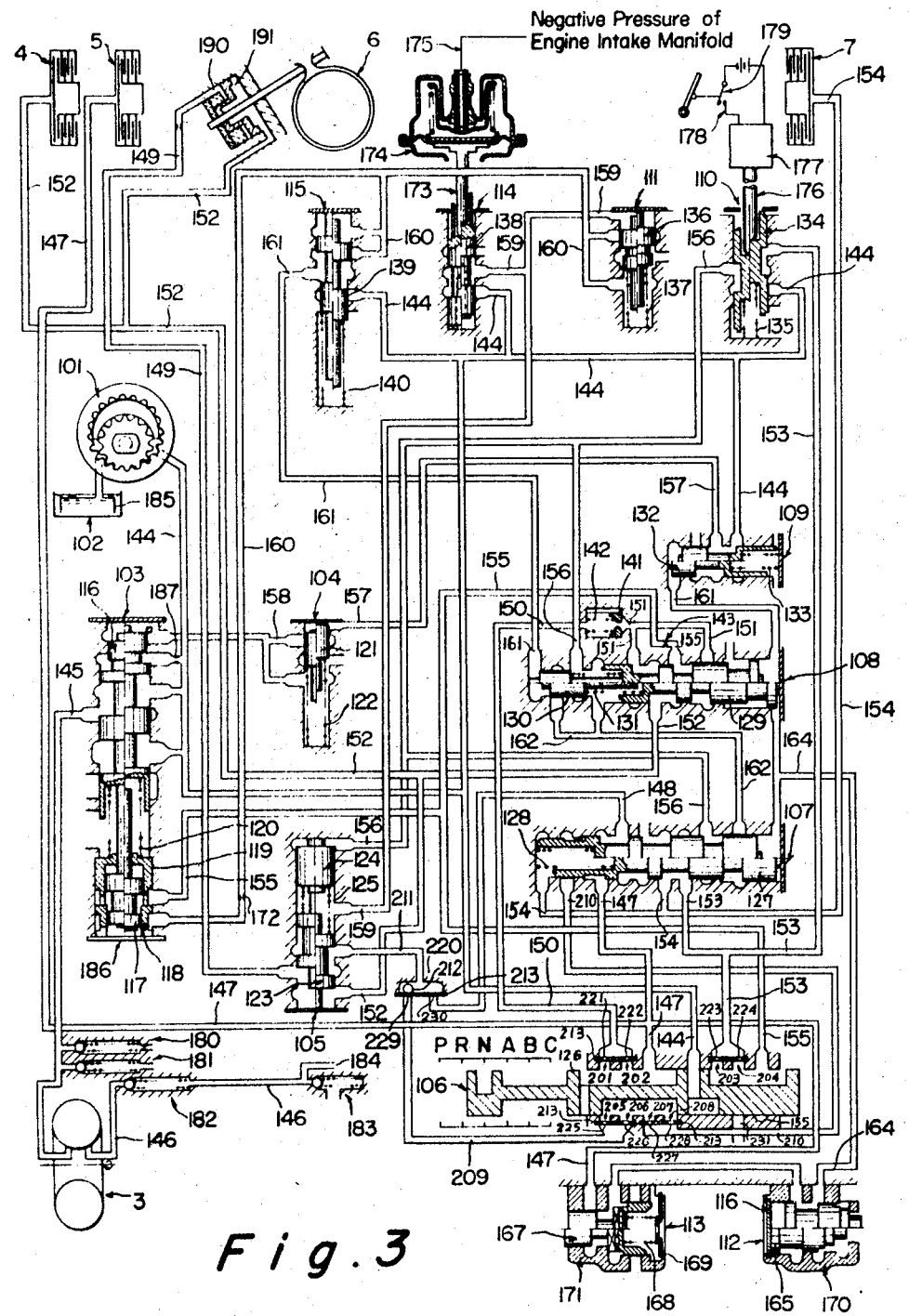
FIG. 3 is a schematic diagram illustrating the arrangement of various valves and passageways in an automatic shifting device according to the present invention, shown with a selecting valve depicted in section taken along the line III—III of FIG. 5.
Figure 4:
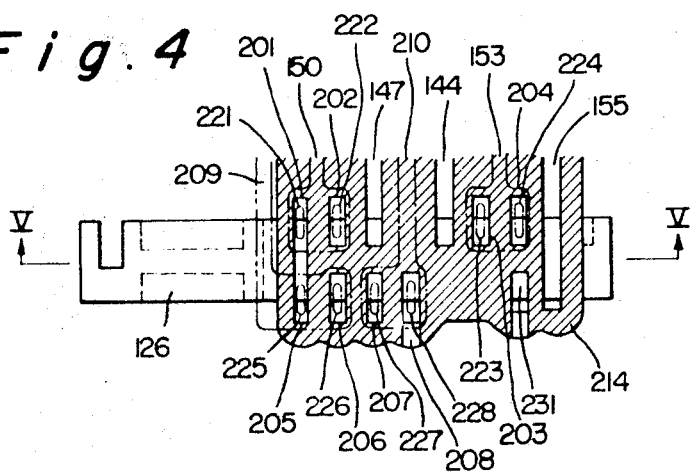
FIG. 4 is a sectional view of a manually selecting valve to be used in the automatic shifting device of the invention, taken along the line IV—IV of FIG. 5.
Figure 5:
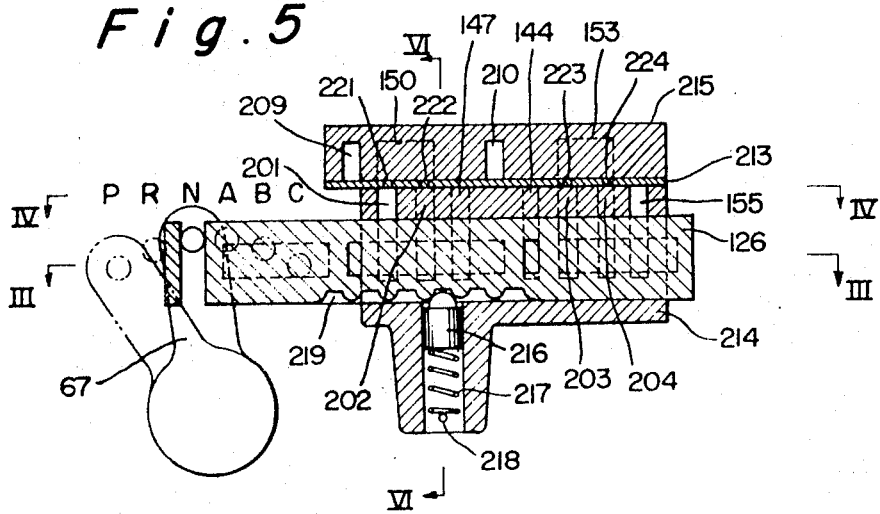
FIG. 5 is a sectional view of the manually selecting valve, taken along the line V—V of FIG. 4.
Figure 6:
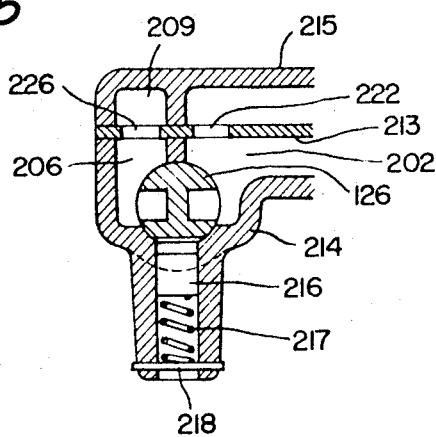
FIG. 6 is a sectional view taken along the line VI—VI of FIG. 5.

Referring to FIG. 1–A, illustrating, in a skeleton diagram, an automatic speed change gear to be operated at three forward stages and one rearward stage of speed reduction ratio, 1 is a driving shaft to be actuated by an engine and 2 is a driven shaft, or an output shaft, of the speed change gear. The driven shaft 2 is connected through a suitable transmission mechanism to driving wheels (not shown). The transmission system of the speed change gear comprises a torque converter 3, frictional clutches 4 and 5 to be actuated by hydraulic pressure, frictional brakes 6 and 7 to be also actuated by hydraulic pressure, planetary gear assemblies 8, and a park gear 30.

The torque converter 3 has a pump vane wheel 9 to be driven by a driving shaft 1, a turbine vane wheel 10, and a stator vane wheel 11. The turbine vane wheel 10 is connected to an intermediate shaft 12, while the stator vane wheel 11 is mounted on a sleeve 13 through a one-way clutch 14. The one-way clutch 14 is adapted to allow the rotation of the stator vane wheel 11 in the same direction as the engine crankshaft rotation, or the direction depicted by an arrow 15 in FIG. 1–A, but not in the opposite direction.

The torque converter 3 is filled with a fluid to transmit the power on the pump vane wheel 9 delivered from the driving shaft 1 to the turbine vane wheel 10.

Generally speaking, the turbine vane wheel 10 of a torque converter 3 is driven by a torque larger than the torque delivered to the pump vane wheel 9. In this case, the reaction produced on the stator vane wheel 11 is in the direction opposite to the revolving direction of the driving shaft 1, and hence, the stator vane wheel 11 is held stationary by the one-way clutch 14. When the revolving speed of the turbine vane wheel 10 reaches a predetermined level, the reaction produced on the stator vane wheel 11 becomes to act in the same direction as the revolving direction of the driving shaft 1, and hence, the one-way clutch 14 idles to allow rotation of the stator vane wheel 11. Under such conditions, the torque converter 3 acts simply as a fluid coupling.

The planetary gear assemblies 8 comprise a first planetary assembly having a ring gear 17 secured to the intermediate shaft 16, a sun gear 19 connected to a hollow shaft 18, two or more planet gears 21 to be rotated around the axes thereof and revolved around the sun gear 19 while meshing with both the ring gear 17 and the sun gear 19, and a carrier 20 carrying the planet gears 21 and connected to the driven shaft 2; and a second planetary gear assembly having a ring gear 23 connected to the driven shaft 12, a sun gear 24 connected to the hollow shaft 18, two or more planet gears 26 to be rotated around axes thereof and revolved around the sun gear 24 while meshing with both the ring gear 23 and the sun gear 24, and a carrier 25 carrying the planet gears 26.

The clutch 4 is so arranged as to selectively connect the intermediate shaft 12 driven by the turbine 10 and the hollow shaft 18 having the sun gears 19 and 24 connected thereto. The other clutch 5 is so arranged as to selectively connect the intermediate shaft 12 and the intermediate shaft 16 connected to the ring gear 17.

The brake 6 acts to stop the two sun gears 19 and 24 by tightly holding the drum 27. The other brake 7 acts to stop the carrier 25 of the second planetary gear assembly.

The one-way clutch 28 is adapted to allow the rotation of the carrier 25 in the same direction as the arrow 15, but not in the opposite direction.

An oil pump 101 is driven by the engine through the driving shaft 1 to provide fluid to the automatic shifting device according to the present invention.

The operation of the speed change gear of FIG. 1–A in each of the three forward stages and one rearward stage of speed reduction ratio will now be described.

The gear train arrangement for the forward first stage is achieved by engaging only the clutch 5 (the gear train of FIG. 1–B), or by engaging the clutch 5 while actuating the brake 7 (the gear train of FIG. 1–C). When only the clutch 5 is engaged, the power from the engine is delivered to the ring gear 17 of the first planetary gear assembly through the torque converter 3, the intermediate shaft 12, the clutch 5, and the other intermediate shaft 16. The carrier 25 of the second planetary gear assembly cannot rotate in the direction opposite to the ring gear 17 by the action of the one-way clutch 28. The ring gear 17 rotates the planet gears 21 of the first planetary gear assembly in the same direction as the ring gear 17, to cause rotation of the sun gear 19 in the direction opposite to the ring gear 17. Accordingly, the sun gear 24 of the second planetary gear assembly, which is connected with the sun gear 19, also rotates in the opposite direction, to cause rotation of the planet gears 26 of the second planetary gear assembly in the same direction as the ring gear 17. Since the carrier 25 of the planet gears 26 cannot rotate in the direction opposite to the ring gear 17, the ring gear 23 of the second planetary gear assembly rotates in the same direction as the ring gear 17. Accordingly, the driven shaft 2 to be rotated together with the ring gear 23 revolves in the same direction as the ring gear 17, or in the direction of the arrow 15. The carrier 20 of the first planetary gear assembly rotates integrally with the driven shaft 2. Thus, the speed change gear is operated at the forward first stage of speed reduction ratio.

In the forward first stage operation with only one clutch, i.e. the clutch 5, being engaged, if the automobile is so driven as to let the driven shaft 2 accelerate the engine, the one-way clutch 28 cannot hold the carrier 25 stationary, and hence, the so-called engine brake cannot be effected. Therefore, when the engine-brake is necessary during the first forward stage of operation, the brake 7 is actuated in conjunction with the clutch 5, so that the carrier 25 is held stationary to effect the engine-brake.

In the second forward stage of operation, the clutch 5 is engaged while actuating the brake 6, and the clutch 4 is disengaged while releasing the brake 7 (the gear train of FIG. 1–D). As in the case of the forward first stage of operation, the power is delivered to the ring gear 17 through the intermediate shaft 12, the clutch 5, and the other intermediate gear 16. On the other hand, the brake 6 holds the drum 27 stationary, to prevent the rotation of the sun gear 19. As a result of it, the planet gears 21 revolve around the then stationary sun gear 19 to cause rotation of the carrier 20 integrally connected to the driven shaft 2. Thus, the driven shaft 2 revolves at a reduced speed in the direction of the arrow 15, to achieve the second forward stage operation.

In the gear train for the third forward stage of operation, the clutches 4 and 5 are engaged while releasing the brakes 6 and 7 (the gear train of FIG. 1–E). As in the case of forward first and second stages of operation, the power is delivered to the ring gear 17 through the intermediate shaft 12 and the clutch 5, and at the same time, the power is transmitted to the sun gear 19 through the clutch 4. Thus, the entire first planetary gear assembly, including the ring gear 17, the sun gear 19, and the carrier 20 rotates as an integral body at the same speed in the same direction, to produce the third stage of speed reduction ratio.

In the gear train for the rearward stage of speed reduction ratio, the clutch 4 is engaged while actuating the brake 7, and the clutch 5 is disengaged and the brake 6 is released (the gear train of FIG. 1–F). As in the case of forward stages of operation, the power is delivered to the sun gear 24 of the second planetary gear assembly through the intermediate shaft 12, the clutch 4, and the hollow shaft 18. Since the carrier 25 is held stationary by the brake 7, the planet gears 26 rotate around the axes thereof in the opposite direction to the rotation of the sun gear 24, but such planet gears 26 do not revolve around the sun gear 24. Therefore, the ring gear 23 of the second planetary gear assembly and the driven shaft 2 connected integrally with the ring gear 23 revolve in the direction opposite to the sun gear 24 at a reduced speed, so that a rearward stage of speed reduction ratio is achieved.

FIG. 2 shows a parking mechanism to be used when the shifting device of the present invention is held at the "park" position. The parking gear 30 is secured to the driven shaft 2, as shown in FIG. 1. The parking mechanism includes a claw 61 held in a suitable portion 50 of the transmission case to hold stationary the parking gear 30 and the driving shaft 2 connected thereto, a selecting spool 126 of the manually selecting valve to be described hereinafter, a roller 62 pinned to said claw 61, another roller 63 pinned to the portion 50 of the transmission case, a wedge 64 to push up the roller 62 together with the claw 61 until the claw 61 meshes with said park gear 30, and a pushing bar 65 secured to the claw 61. The parking mechanism further comprises an arm 66 to actuate the pushing bar 65 when the manually selecting valve is at the "P" position in the manner to be described hereinafter, a selecting arm 67 to set the manually selecting valve to a desired position, and an actuating lever 68 to operate the arm 66 and selecting arm 67, which actuating lever 68 is associated with a selecting lever 70 located by a steering wheel 71 at the driver's seat through a suitable link mechanism 69.

If the driver places the manually selecting lever 70 to the parking position "P," the movement of the lever 70 is transmitted to the selecting arm 67 through the link mechanism 69 and the actuating lever 68, so that the selecting arm 67 moves the selecting spool 126 to the position "P." At the same time, the tip end 72 of the arm 66 urges the pushing bar 65 and the wedge 64 rightwards, so as to push up the roller 62 and the claw 61 to hold the parking gear stationary. In this particular embodiment, the selecting lever 70 is located by the steering wheel 71, but it can be mounted at any suitable position on the floor or dashboard, and connected to the lever 70 with the actuating lever 68 through a suitable link means.

In the following description, the hydraulic control system is explained by taking an example using oil pressure, but the present invention is not limited to the use of such oil pressure, and any other suitable fluid pressure system can be used for controlling various valves and gears.

Now, referring to FIG. 3, the oil pump 101, which is actuated by the driving shaft 1 through the pump vane wheel 9 of the torque converter 3, provides oil pressure for operating the shifting device, frictional clutches 4 and 5, frictional brakes 6 and 7, and the torque converter 3, as well as the lubrication oil for such rotary members of the speed change gear. As long as the engine is running, the oil pump 101 sucks up oil from an oil sump 102 at the lowermost portion of the transmission case 50 through a strainer 185 and a suction port provided on the transmission case 50, while eliminating dust particles at the strainer 185, and the oil thus sucked is delivered to the passageway 144 as a source of operating fluid pressure of various members of the speed change gear. The pressure of the oil in the passageway 144 is regulated to a predetermined level by a line pressure regulating valve 103. The line pressure regulating valve 103 has a spool 116 and a spring 120. The spool 116 is urged upwards at the lower end thereof by the elastic force of the spring 120, throttle pressure (to be described hereinafter) of the passageway 160 delivered through the spool 117 at a pressure intensifying valve 186, and the line pressure (to be described hereinafter) of a passageway 155, while the spool is urged downwards at the upper end thereof by the line pressure of the passageway 144 delivered through the orifice 187 and another pressure (to be described hereinafter) from the passageway 158.

The operating oil pressure for the torque converter 3 is fed from the passageway 144 through the line pressure regulating valve 103 and another oil passageway 145, and the oil pressure is kept below a certain level by a converter relief valve 181 incorporated in the casing of the oil pump 101. The oil expelled from the torque converter 3 is fed into the passageway 146, and the pressure of the oil thus expelled is kept above a certain level by a pressure retaining valve 182 incorporated in the casing of the oil pump 101. When the oil pressure is higher than the aforesaid predetermined level, the oil pressure retaining valve 182 is opened to feed the oil to the rear lubricating portion 184 of the speed change gear through the passageway 146 and a hole bored on the transmission case 50. If the pressure of such lubricating oil is too high, a relief valve 183 is opened to release the pressure. The lubrication oil for the front lubricating portion of the speed change gear is fed from the passageway 145 through a front lubricating valve 180 having an orifice.

A manually selecting valve 106 comprises a spool 126. The oil pressure fed from the passageway 144 is selectively delivered to the related passageways 147, 150, 153, 155, 209 by the spool 126 which is moved in response to the selection of the operative position of the selecting lever 70 at the driver's seat. The passageway 147 is communicated with a second governor valve 113, a 1–2 shift valve 107, and the clutch 5. The passageway 155 is communicated with the pressure intensifying valve 186, and a 2–3 shift valve 108. The passageway 150 is communicated with a one-way throttle valve comprising an orifice 141 and a spring 142, and becomes a different passageway 151 after passing through the one-way throttle valve and leads to a 2–3 shift valve 108. The passageway 153 is communicated with the 1–2 shift valve 107 and a solenoid down shift valve 110. The passageway 209 is communicated with a 2–3 back-out valve 105 through a change-over valve 220. The passageway 210 is communicated with the 1–2 shift valve 107. The driven shaft 2 has a first governor valve 112 and the second governor valve 113 secured thereon. As described in the above, the second governor valve 113 receives the line pressure from the passageway 147 through the transmission case 50. The second governor valve 113 comprises a spool 167 and a spring 168, and produces an oil pressure proportionate to the revolving speed of the driven shaft 2. The governor pressure regulated by the second governor valve 113 is fed to the passageway 163 and delivered to the first governor valve 112 therethrough. At the first governor valve 112, if a spool 165 is at its open position, the passageway 163 is communicated with another passageway 164 therethrough, and the passageway 164 acts to deliver the governor pressure to the automatic shifting device through the transmission case 50. The passageway 164 is communicated with the end surfaces of the 1–2 shift valve 107, the 2–3 shift valve 108, and the cut-back valve 109.

The 1–2 shift valve 107 comprises a spool 127 and a spring 128, and the valve is communicated with the passageways 147, 153, 156, and 210 as well as a throttle system passageway 162, in such a fashion that the line pressure is transferred from the passageway 147 to 148 and from the passageway 153 to 154. The passageway 148 is communicated with the 2–3 back-out valve 105 through the change-over valve 220. The passageway 154 is communicated with both the spring side of the 1–2 shift valve 107 and the brake 7.

The 2–3 shift valve 108 comprises a spool 129. A throttle reducing valve 130 and a spring 131 are arranged to act on the left hand end of the spool 129. The 2–3 shift valve 108 is communicated with the passageways 151 and 155, and the oil is delivered to the passageway 152. The passageway 152 is communicated with the 2–3 back-out valve 105, the clutch 4, and the releasing side 191 of the servo-piston 188 of the brake 6. The throttle reducing valve 130 is communicated with a throttle system passageway 161, another passageway 162 receiving a reduced oil pressure from the passageway 161, and a line pressure passageway 156.

The cut-back valve 109 comprises a spool 132, and a spring 133, and the governor pressure is introduced to one end thereof through the passageway 164. The line pressure passageway 144 is selectively communicated with another line pressure passageway 157 by means of the movement of the spool 132 of the cut-back valve 109.

The solenoid down-shift valve 110 comprises a spool 134 and a spring 135, and is connected to a down-shift solenoid 177 through a push bar 176. The solenoid down-shift valve 110 is connected to the line pressure passageways 144 and 153, and such line pressure passageways are selectively communicated with another line pressure passageway 156. An electric circuit of the down-shift solenoid 177 includes a switch 179 having a push bar so arranged as to close the switch 179 when the accelerator pedal is depressed by a driver in excess of a certain predetermined limit.

A second throttle valve 111 comprises a spool 136 and a spring 137, and throttle passageway 159 is connected thereto. The oil pressure regulated by the second valve 111 is delivered to another throttle passageway 160 as well as the lower end of the second throttle valve 111, where the spring 137 acts. The passageway 160 leads to a throttle pressure intensifying valve 115 and to the other pressure intensifying valve 186.

A first throttle valve 114 has a spool 138, and is connected to a vacuum diaphragm 174 through a link rod 173. The diaphragm 174 is communicated with the engine's intake manifold through a tube 175. The line pressure passageway 144 is connected to the first throttle valve 114, and the throttle system pressure, which is regulated by the first throttle valve 114 is delivered to the throttle pressure passageway 159. The passageway 159 leads to the second throttle valve 111 and the 2–3 back-out valve 105.

The throttle pressure intensifying valve 115 comprises a spool 139 and a spring 140, and is connected to the throttle pressure passageway 160 and the line pressure passageway 144. The throttle system pressure intensified by the throttle pressure intensifying valve 115 is delivered to another passageway 161. The passageway 161 leads to the throttle pressure reducing valve 130.

The reducing valve 104 comprises a spool 121 and a spring 122, and connected to the line pressure passageway 157, and the reduced pressure is delivered to a passageway 158, which leads to the line pressure regulating valve 103.

The 2-3 back-out valve 105 comprises a spool 123, spring 125, and a manual low plug 124, and it is connected to the line pressure passageways 211, 152, 156, and a throttle system passageway 159, and delivers its output to the actuating side servo-piston 190 of the brake 6 through a line pressure passageway 149.

The change-over valve 220 comprises a steel ball 212 fitted in a groove and a pair of circular holes 229 and 230 formed on a partitioning board 213. The hole 229 is communicated with the passageway 209, while the hole 230 with another passageway 148. A third passageway 211 is also connected to the change-over valve 220. The steel ball 212 can block out the holes 229 and 230, but it cannot interrupt the passageway 211, because the passageway 211 has an elongated rectangular opening extending toward the groove in which the steel ball 212 is movable. Thus, when the line pressure is fed to the passageway 148, the hole 229 is blocked by the steel ball 212. On the other hand, when the line pressure is fed to the passageway 209, the hole 230 is blocked by the steel ball 212. Accordingly, the change-over valve 220 delivers line pressure to the passageway 211, when the line pressure exists in either one of the passageways 148 and 209.

Since the change-over valve 220 comprises a steel ball 212 and the partitioning board 213 having a pair of holes 229 and 230, the passageways 148 and 211 can be directly connected simply by eliminating the ball 212 and filling the hole 229.

In the example of FIG. 3, the change-over valve 220 comprises a steel ball and holes, but any change-over valve, which connects either of the passageways 148 and 209 having a higher pressure than the other to the passageway 211, can be utilized in the shifting device of the present invention.

The operation of the automatic shifting device according to the present invention will now be described in detail. The various passageways extending from the manually selecting valve 106 to different parts of the shifting device will be explained at first.

The passageway 147 is communicated with the second governor valve 113 to transfer the governor pressure. The passageway 147 is also connected to the 1-2 shift valve 107, and if the valve 107 is at its first stage (low speed) position, the passageway 147 is interrupted by the valve 107, while if the valve 107 is at its second stage (high speed) position, the passageway 147 is communicated with the passageway 148, so that the brake 6 is actuated by operating the band brake servo-piston 188 through the change-over valve 220 and the 2-3 back-out valve 105. The passageway 147 also extends to the clutch 5 to engage it.

The passageway 155 communicates with the pressure intensifying valve 186 to increase the line pressure of the passageway 144. The passageway 155 also communicates with the 2-3 shift valve 108 through the orifice 143, and if the valve 108 is at the second stage (low speed) position, the passageway 155 is further communicated with another passageway 152 which extends to the release side 191 of the band brake servo to release it and to the clutch 4 to engage it, while if the valve 103 is at the third stage (high speed) position, the passageway 155 is interrupted by the spool 129 of the valve 108.

The passageway 150 communicates with the 2-3 shift valve 108 through the one-way throttle valve orifice 141, and if the valve 108 is at the second stage (low speed) position, the passageway 150 is interrupted by the valve 108, while if the valve 108 is at the third stage (high speed) position, the pressure in the passageway 151 connected to the passageway 150 is communicated with the passageway 152 and delivered to the release side 191 of the band brake servo to release the brake 6 and to the clutch 4 to engage it.

The passageway 153 is at first communicated with the solenoid downshift valve 110, and if the solenoid is not energized, the passageway 153 communicates with another passageway 156, so that the oil pressure is delivered to the 2-3 back-out valve 105, the 2-3 shift valve 108, and the 1-2 shift valve 107. As a result of it, the 2-3 shift valve 108 and the 1-2 shift valve 107 are shifted to their low speed sides, respectively. The passageway 153 also communicates directly with the 1-2 shift valve 107, and if the valve 107 is at its first stage (low speed) position, the oil pressure is delivered to the multi-disk brake 7 through another passageway 154 to actuate it, while if the valve 107 is at the second stage position, the passageway 153 is blocked thereby.

The passageway 209 communicated with the actuating side 190 of the band brake servo through the change-over valve 220 and the 2-3 back-out valve 105, so that the brake 6 is actuated.

The passageway 210 communicates with the 1-2 shift valve 107, and if the valve 107 is at the second stage (high speed) position, a pressure is applied to the valve 107 to shift it to the first stage (low speed) position.

By communicating the line pressure passageway 144 with the aforesaid six passageways 147, 155, 150, 153, 209, and 210 in a suitable manner, a variety of operative stages of the automatic speed change gear can be achieved.

The details of the speed selecting mechanism will now be described, by referring to FIGS. 2 to 6.

The aforementioned selecting spool 126 is moved by the arm 67, which follows the movement of the selecting lever 70 located by the steering wheel at the driver's seat. The spool 126 selects one of possible combinations of speed change gear operative conditions, by cooperating with a lower valve body 215 associated with the upper valve body 214 and a partitioning plate 213.

The selecting spool 126 has a number of oil grooves formed thereon, so as to communicate the line pressure with various oil grooves on the upper valve body 214; namely oil grooves, 201, 202, 147, 203, 204, 155, 205, 206, and 207. In addition to the above-listed oil grooves, the upper valve body 214 has other oil grooves 208 and 231, which communicate with the oil sump 102. When the line pressure is not applied to any of the oil grooves 201, 202, 147, 203, 204, 155, 205, 206, and 207, the line pressure is released to the oil sump 102 through the aforesaid oil grooves 208 and 231 and end surfaces of the upper valve body 214. Thus, generation of residual pressure is prevented. The oil grooves 201 and 205 are communicated with each other within the upper valve body 214.

The upper valve body 214 has a detent plunger 216 fitted therein and urged against the selecting spool 126 by a spring 217 and a pin 218. The selecting spool 126 has detent grooves 219, with which the detent plunger 216 is engaged so as to properly position the spool 126 and prevent rotation of the spool 126.

The lower valve body 215 has oil grooves 150, 153, 209, and 210, while the partitioning plate 213 has oil holes 221, 222, 223, 224, 225, 226, 227, and 228. The oil grooves 201 and 202 respectively communicate with the oil groove 150 through oil holes 221 and 222; the oil grooves 203 and 204 respectively communicate with the oil groove 153 through oil holes 223 and 224; oil grooves 205 and 206 respectively communicate with the oil groove 209 through oil holes 225 and 226; and oil grooves 207 and 208 respectively communicate with the oil groove 210 through oil holes 227 and 228.

With such arrangement, it is possible to selectively provide communication between the oil grooves 150 and 201 or between the oil grooves 150 and 202, by opening one of the oil holes 221 and 222 while closing the other one of the oil holes. Similarly, by opening one of the oil holes 223 and 224 while closing the other one of the oil holes, there can be selectively provided a communication between the oil grooves 153 and 203 or between oil grooves 153 and 204. By opening one of the oil holes 225 and 226 while closing the other one of the oil holes, one can select communcation either between the oil grooves 209 and 205 or between 209 and 206. Furthermore, by opening one of the oil holes 227 and 228 while closing the other one of the oil holes, one can achieve a communication between the oil grooves 210 and 207 or between oil grooves 210 and 208. Since the oil groove 208 is permanently communicated with the oil sump 102 regardless of whether the oil hole 228 is open or closed, when the oil hole 228 is open, the passageway 210 communicates with the oil sump 102.

In this particular embodiment, the manually selecting valve 106 has six positions; namely a position P for parking, a position R for reverse, a position N for neutral, and postions A, B, and C for forward driving. It is easy to reduce the operative positions to five by eliminating the position C. FIG. 7 shows the manner in which the line pressure passageway 144 is communicated with either one of the oil grooves 147, 155, 201, 202, 203, 204, 205, 206, and 207 for each operative position of the speed selecting valve. Since the oil grooves 201 and 205 are communicated with each other permanently, they are shown in the same column in the figure. The circular mark (○) in the figure means that the line pressure passageway 144 is communicated with particular passageways, while the lack of such circular mark means that the particular passageways communicate with the oil sump 102 and have no oil pressure.

The same meaning of the symbols and the lack of symbol applies to FIGS. 8 to 12.

Different combinations of communicated passageways, which are obtainable by selecting different blocking patterns of the oil holes 221 to 228 of the partitioning board 213 and selectively using the ball 212 in the change-over valve 220, will now be described. It is assumed here that the oil holes 229 and 230 are kept open.

FIG. 8 shows the possible combinations of communicated passageways for the first case of oil hole selection, in which it is assumed that the oil holes 221, 223, and 228 are open; that the oil holes 222, 224, 225, 226, and 227 are blocked; and that the steel ball 212 does not exist. The combinations are shown by the manner in which the line pressure of the passageway 144 is delivered to passageways 150, 153, 147, and 155 for each operative position of the manually selecting valve 106. With the manually selecting valve set at the position P, only the passageway 153 receives the oil pressure to keep the speed change gear in a semi-neutral condition. At the same time, with the valve 106 set at the position P, the driven shaft 2 is mechanically locked in the state as stopped, by means of the aforesaid parking device. With the valve 106 set at the position R, the oil pressure is delivered to the passageways 153 and 155 to engage the clutch 4 and actuate the brake 7, so that the driven shaft 2 can rotate in the reverse direction. With the manually selecting valve set at the N position, the oil pressure is not delivered to any passageway at all to keep the speed change gear under completely neutral conditions.

Since the operation of the speed change gear for the aforesaid three positions, namely, P, R, and N, is the same in the cases to be described hereinafter referring to FIGS. 9 to 12, it will not be repeated.

With the manually selecting valve 106 set at the position A, the line pressure is delivered to the pasageways 150 and 147, so that the speed change ratio of the speed change gear varies automatically among the forward first, second, and third stages. Under these conditions, engine brake cannot be effected even in the forward first stage, because the brake 7 is realesed. Let it be assumed that this condition is referred to as the "D" condition.

With the manually selecting valve 106 set at the B position, the line pressure is transferred to the passageways 153 and 147. If an automobile equipped with the automatic shifting device of this embodiment is run at the forward third stage with the shifting device kept under the D condition, and if the selecting lever 70 is moved to the B position, the speed change gear is shifted to the second stage at once. Thereafter, under such conditions, if the automobile speed is further reduced, the speed change gear is shifted to the first operative stage. In this case, the brake 7 is actuated to bring the speed change gear to the first stage operation, in which engine brake is applicable, and at the same time, the line pressure of the passageway 153 acts on the end surface of the 1–2 shift valve 107, so that the speed change gear can never be shifted automatically to the forward second stage. Let it be assumed that this condition is referred to as the "L" condition.

Since the distribution of the line pressure in case with the manually selecting valve 106 set at the C position is identcial with that in the preceeding case with the manually selecting valve set at the B position, the speed change gear is operated under the L condition.

Accordingly, in the first case of oil hole selection, the six operative positions of the speed selecting valve 106 act, in effect, to produce the P, R, N, D, L, and L conditions, respectively. Therefore, it is convenient to use such selection of oil holes and steel ball for producing five positions; namely, P, R, N, D, and L.

FIG. 9 shows the possible combinations of communicated passageways for the second case of oil hole selection, in which it is assumed that the oil holes 222, 224, 226, and 228 are open; that the oil holes 221, 223, 225, and 227 are blocked; and that the steel ball 212 is provided. The different combinations are shown by the manner in which the line pressure of the passageway 144 is delivered to the passageways 150, 153, 209, 147, and 155 of each operative position of the manually selecting valve 106.

With the manually selecting valve set at the position A, the line pressure is delivered to the passageways 150 and 147, to run the speed change gear under the D condition.

With the manually selecting valve 106 set at the position B, the line pressure is delivered to the passageway 209, in addition to the passageways 150 and 147. The passageway 209 delivers the line pressure to the actuating side 190 of the band brake servo-piston 188 through the 2–3 back-out valve 105 and the change-over valve 220. Thus, with the position B, the speed change gear is not shifted to the first stage, but the operation is automatically shifted between the second and the third stages. Let it be assumed that such operation is referred to as the "$D_2$" condition.

With the speed selecting valve 106 set at the C position, the line pressure is delivered to the passageways 153 and 147 to operate the speed change gear under L condition.

Thus, with the second case of oil hole selection, the speed change gear is operated under six different conditions, i.e. P, R, N, D, $D_2$, and L. Here the D condition can be referred to as the "$D_1$" condition, as compared with the second stage starting condition $D_2$, and hence, the automatic shifting device according to this case of oil hole selection can be operated in six different conditions; namely, P, R, N, $D_1$, $D_2$ and L.

FIG. 10 shows the possible combinations of communicated passageways for the third case of oil hole selection, in which it is assumed that the oil holes 222, 224, 225, and 228 are open; that the oil holes 221, 223, 226, and 227 are blocked; and that the steel ball 212 is used. The different combinations are shown by the manner in which the line pressure of the passageways 209, 150, 153, 147, and 155 for each operative position of the speed selecting valve 106.

With the speed selecting valve 106 set at the position A, the line pressure is delivered to the passageways 209, 150, and 147 to run the speed change gear under $D_2$ condition.

With the speed selecting valve 106 set at the B position, the line pressure is delivered to the passageways 150 and 147 to operate the speed change gear under the D condition.

With the speed selecting valve 106 set at the C position, the line pressure is delivered to the passageways 153 and 147 to operate the speed change gear under L condition. Thus, in this case, the automatic shifting device according to the present invention can be operated under six different conditions; namely, P, R, N, $D_2$, D, and L; or P, R, N, $D_2$, $D_1$, and L conditions.

FIG. 11 shows the possible combinations of communicated passageways for the fourth case of oil hole selection, in which it is assumed that the oil holes 221, 224, and 207 are open; that the oil holes 222, 223, 225, 226, and 228 are blocked; and that the steel ball 212 is not used. The different possible combinations are shown by the manner in which the line pressure of the passageway 144 is delivered to the passageways 150, 153, 210, 147, and 155 for each operative position of the manually selecting valve 106.

With the manually selecting valve 106 set at the A position, the line pressure is delivered to the passageways 150 and 147 to run the speed change gear under the D condition.

With the manually selecting valve 106 set at the B position, the line pressure is delivered only to the passageway 147, to apply the line pressure to the clutch 5 and the 1–2 shift valve 107. If the 1–2 shift valve 107 is at the second stage position, the line pressure is delivered to the actuating side 190 of the band brake servo-piston 188 to actuate it. Thus, with the valve 106 at the B position, automatic shifting takes place between the first stage without engine brake and the second stage. Since the brake 7 is not actuated, the engine brake cannot be effected in the first stage. If the selecting lever 70 is moved to the B position when the automobile is running at the third stage of speed ratio, the speed change gear is immediately shifted to the second stage. Let it be assumed that such running condition is referred to as the "$L_2$" condition.

With the manually selecting valve 106 set at the C position, the line pressure is delivered to the passageways 153, 210, and 147. The passageway 210 delivers the line pressure to the 1–2 shift valve 107 to generate a force to urge the valve from the second stage (high speed) position to the first stage (low speed) position, and hence, the shifting toward the first operating stage takes place from an automobile speed higher than the corresponding automobile speed in the case of the aforesaid L condition. As the operation shifts into the first stage, the brake 7 is actuated to make it possible to apply the engine brake, and at the same time, the line pressure is applied to the edge surface of the 1–2 shift valve 107 to prevent the shift to the second stage. If the selecting lever 70 is moved to the C position when the automobile is run at the third stage of speed change ratio, the speed change gear is shifted immediately to the second stage, and when the automobile speed is reduced sufficiently to insure safe shift to the first stage, it is shifted to the first stage. Let it be assumed that such running condition is referred to as the "$L_1$" condition. Thus, with the fourth case of the oil hole selection, the automatic shifting device of the invention can be operated in six different conditions; namely, P, R, N, D, $L_2$, and $L_1$ conditions.

FIG. 12 shows the possible combinations of communicated passageways for the fifth case of oil hole selection, in which it is assumed that the oil holes 221, 224, 226, and 227 are open; that the oil holes 222, 223, 225, and 228 are blocked; and that the steel ball 212 is used. The different possible combinations are shown by the manner in which the line pressure of the passageway 144 is delivered to the passageway 150, 153, 209, 210, 147, and 155 for each operative position of the manually selecting valve 106.

With the manually selecting valve 106 set at the A position, the line pressure is delivered to the passageways 150 and 147 to run the speed change gear under the D condition.

With the manually selecting valve 106 set at the B position, the line pressure is delivered to the passageways 209 and 147. Under such condition, the clutch 5 is kept energized and the band brake 6 is kept actuated, and hence, the speed change gear is run at the second stage. Whatever the prevailing running condition is, as soon as the selecting lever 70 is moved to the B position, the speed change gear is moved to the second stage. Let it be assumed that such running condition is referred to as the "2" condition.

With the manually selecting valve 106 set at the C positon, the line pressure is delivered to the passageways 153, 210, and 147 to run the speed change gear under the $L_1$ condition. Thus, with the fifth case of the oil hole selection, the automatic shifting device according to the present invention can be operated in six different conditions; namely P, R, N, D, "2," and $L_1$ conditions. Under the $L_1$ condition, the speed change gear is almost always run at the first stage, and hence, it may be referred to as the "1" condition, in view of the fact that the speed change gear is run at the second stage under the "2" condition. Then, with the fifth case, the automatic shifting device can be run under the 6 different conditions of P, R, N, D, "2," and "1".

As described in the foregoing, by selecting the blockage pattern of the oil holes of the partitioning board 213 and the use of steel ball 212, it is made possible to provide five different combinations of operative conditions; namely, P, R, N, D, and L; P, R, N, D, $D_2$, and L (or P, R, N, $D_1$ $D_2$, and L); P, R, N, $D_2$, D, and L (or P, R, N, $D_2$, $D_1$ and L); P, R, N, D, $L_2$, and $L_1$; and P, R, N, D, "2," and L (or P, R, N, D, "2", and "1"). By expanding the mechanism used to achieve the five combinations, it is possible to attain a number of more different combinations of operative conditions.

In view of the fact that the passageway 209 communicated with the manually selecting valve 106 can act as if it forced that operative condition, in which the speed change gear cannot be run with the engine brake applied in the first stage due to the function of the 1–2 shift valve 107, to the second stage of operation, it is readily possible to provide other oil passageways that actually carry out such forcing.

Furthermore, since the passageway 210 communicated with the manually selecting valve 106 acts to force the speed change gear to the first stage running by means of the 1–2 shift valve 107, it is possible to devise other mechanisms and passageways to perform the similar functions.

Moreover, the aforesaid passageway 210 is not necessary for carrying out the combinations PRNDL, PRND$D_2$L, and PRN$D_2$DL, such passageway can be dispensed with.

As described in the foregoing, according to the present invention, by modifying the structure of the partitioning board of a speed selecting valve, and by selecting the use of a steel ball in the change-over valve of a particular fluid passageway, different combinations of running conditions useful for the currently used speed change gears can be easily achieved, without any additional modifications. Thus, with the automatic shifting device according to the present invention, speed change gears of different operative characteristics can be achieved with minimum change of parts, namely replacement of a partitioning board of a manually selecting valve and addition or removal of a steel ball. Therefore, the invention contributes greatly to the industry by improving the productivity and reducing the manufacturing cost of the automatic shifting device.

What I claim is:

1. An automatic shifting device of an automatic speed change gear for automobiles, having a hydraulic control means to be actuated manually by a manually selecting valve means so as to select different speed changing positions; said manually selecting valve means comprising a main valve box having a plurality of fluid grooves and a through hole to receive a speed selecting spool valve, said speed selecting spool valve being adapted to slide in said through hole and having fluid grooves so arranged as to selectively guide operative hydraulic pressure delivered from a fluid pump to said fluid grooves of said valve main box, a partitioning board covering said fluid grooves of said main valve body and having a plurality of fluid holes to selectively transfer the hydraulic pressure in said fluid grooves, and an auxiliary valve box to engage with said main valve box with said partitioning board inserted therebetween, said auxiliary valve box having a plurality of fluid grooves constituting speed control fluid passageways and to deliver the hydraulic pressure guided to the fluid grooves of the main valve box through said fluid holes of said partitioning board toward said speed control fluid passageways, wherein a number of different combinations of operative conditions of said automatic speed change gear can be achieved simply by modifying the position and number of said fluid holes of said partitioning board.

2. An automatic shifting device of an automatic speed change gear for automobiles, according to claim 1, wherein a change-over valve to change over fluid passageways by the existence of a steel ball is provided in said speed control fluid passageways, whereby a number of different combinations of operative conditions of said automatic speed change gear can be achieved simply by providing and dispensing with said steel ball, in addition to said modification of the position and number of said fluid holes of said partitioning board.

3. An automatic shifting device according to claim 2, wherein said manually selecting valve has at least 5 different operative positions, corresponding to not less than 5 different combinations of operative conditions of the speed change gear including a position P for parking condition, a position R for reversing condition, a position N for neutral condition, and at least 2 different forward positions for not less than 2 different forward operative conditions of the speed change gear.

References Cited

UNITED STATES PATENTS 3,410,301  11/1968  Merriner et al. _____ 137—269

HENRY T. KLINKSIEK, Primary Examiner

ROBERT J. MILLER, Assistant Examiner